United States Patent
Patidar et al.

(10) Patent No.: US 11,513,967 B1
(45) Date of Patent: Nov. 29, 2022

(54) SYSTEMS AND METHODS FOR PRIORITIZING CACHE OBJECTS FOR DELETION

(71) Applicant: VERITAS TECHNOLOGIES LLC, Mountain View, CA (US)

(72) Inventors: Jitendra Patidar, Pune (IN); Anindya Banerjee, Pune (IN)

(73) Assignee: VERITAS TECHNOLOGIES LLC, Mountain View, CA (US)

( * ) Notice: Subject to any disclaimer, the term of this patent is extended or adjusted under 35 U.S.C. 154(b) by 0 days.

(21) Appl. No.: 17/138,086

(22) Filed: Dec. 30, 2020

Related U.S. Application Data

(63) Continuation of application No. 15/980,770, filed on May 16, 2018, now Pat. No. 10,896,132.

(51) Int. Cl.
*G06F 12/08* (2016.01)
*G06F 12/0891* (2016.01)
*G06F 12/0895* (2016.01)

(52) U.S. Cl.
CPC ...... *G06F 12/0891* (2013.01); *G06F 12/0895* (2013.01); *G06F 2212/1044* (2013.01)

(58) Field of Classification Search
CPC ............. G06F 12/0891; G06F 12/0895; G06F 2212/1044
USPC .......................................................... 711/135
See application file for complete search history.

(56) References Cited

U.S. PATENT DOCUMENTS 9,384,138 B2 ‡ 7/2016 Shivashankaraiah ........................ G06F 12/0871

2006/0248124 A1* 11/2006 Petev ................... G06F 12/0842 711/E12.039

OTHER PUBLICATIONS

Cache replacement policies; https://en.wikipedia.org/wiki/Cache_replacement_policies.
Defining Cache Groups chapter in "TimesTen Application-Tier Database Cache User's Guide"; p. 8 of 21 https://docs.oracle.com/cd/E11882_01/timesten.112/e21634/define.htm#TTCAC203.
Data Aging; https://help.sap.com/viewer/7b9e574b5c314aabba48b39918615ad5/750%20SP07/en-US/2f6e1c5219609b33e10000000a44538d.html.

\* cited by examiner
‡ imported from a related application

*Primary Examiner* — Hua J Song
(74) *Attorney, Agent, or Firm* — Patent Law Works LLP

(57) ABSTRACT

Provided computer-implemented methods for prioritizing cache objects for deletion may include (1) tracking, at a computing device, a respective time an externally-accessed object spends in an external cache, (2) queuing, when the externally-accessed object is purged from the external cache, the externally-accessed object in a first queue, (3) queuing, when an internally-accessed object is released, the internally-accessed object in a second queue, (4) prioritizing objects within the first queue, based on a cache-defined internal age factor and on respective times the objects spend in the external cache and respective times the objects spend in an internal cache, (5) prioritizing objects within the second queue based on respective times the objects spend in the internal cache, (6) selecting an oldest object having a longest time in any of the first queue and the second queue, and (7) deleting the oldest object. Various other methods, systems, and computer-readable media are disclosed.

15 Claims, 4 Drawing Sheets

SYSTEMS AND METHODS FOR PRIORITIZING CACHE OBJECTS FOR DELETION

CROSS-REFERENCE TO RELATED APPLICATIONS

This application is a continuation of U.S. patent application Ser. No. 15/980,770, filed May 16, 2018, which is hereby incorporated herein in its entirety by this reference.

BACKGROUND

File systems may cache objects in internal caches as internally-accessed objects and in external caches as externally-accessed objects. Thus, externally-accessed objects may become old on external caches, such as directory entry caches on servers and network file system (NFS) client caches.

When new cache objects need to be cached and the internal caches and/or system memories are full or almost full, needs may arise to free memory for the new cache objects by deleting previously stored objects. However, traditional techniques do not take into account the ages of externally-accessed cache objects and thus may delete cache objects that are only accessed internally and are newer than externally-accessed cache objects. The instant disclosure, therefore, identifies and addresses a need for systems and methods for prioritizing cache objects for deletion.

SUMMARY

As will be described in greater detail below, the instant disclosure describes various systems and methods for prioritizing cache objects for deletion. In some examples, provided techniques take into account times that externally-accessed objects spend on external caches when determining which objects to delete (e.g., from internal caches).

In one embodiment, a method for prioritizing cache objects for deletion may include (1) tracking, at a computing device, a respective time an externally-accessed object spends in an external cache, (2) queuing, when the externally-accessed object is purged from the external cache, the externally-accessed object in a first queue, (3) queuing, when an internally-accessed object is released, the internally-accessed object in a second queue, (4) prioritizing objects within the first queue, based on a cache-defined internal age factor and on respective times the objects spend in the external cache and respective times the objects spend in an internal cache, (5) prioritizing objects within the second queue based on respective times the objects spend in the internal cache, (6) selecting an oldest object having a longest time in any of the first queue and the second queue, and (7) deleting the oldest object. In some examples, more than two queues may be implemented and used for queueing objects.

In an example, the method may include (1) setting, when the externally-accessed object is purged, a respective unhold flag, (2) setting, when the externally-accessed object in the first queue re-accessed internally, a hold flag, (3) transferring, when the externally-accessed object in the first queue having both a respective hold flag and a respective unhold flags set is released, the externally-accessed object to a third queue, and (4) prioritizing objects within the third queue based on time spent in the internal cache. The selecting may further include selecting the oldest object having a longest time in any of the first queue, the second queue, and the third queue. In an example, the method may also include (5) setting the respective hold flag when the externally-accessed object is initially accessed externally, and (6) clearing, when the externally-accessed object is purged, the hold flag.

In an example, the externally-accessed object may be an inode data structure. In another example, the internally-accessed object may be an inode data structure. In an embodiment, the internal cache may be an inode cache. In some embodiments, the inode cache may be in a file system layer, an operating system layer, or a network file system layer. In one example, the external cache may be an inode cache.

In an embodiment, the deleting may be initiated by a system memory reaching maximum capacity. In one example, the deleting may be initiated by an in-core cache reaching maximum capacity.

In one example, a system for prioritizing cache objects for deletion may include several modules stored in memory, including (1) a tracking module, stored in memory, that tracks, at the computing device, a respective time an externally-accessed object spends in an external cache, (2) a first queuing module, stored in the memory, that queues, when the externally-accessed object is purged from the external cache, the externally-accessed object in a first queue, (3) a second queuing module, stored in the memory, that queues, when an internally-accessed object is released, the internally-accessed object in a second queue, (4) a first prioritizing module, stored in the memory, that prioritizes objects within the first queue, based on a cache-defined internal age factor and on respective times the objects spend in the external cache and respective times the objects spend in an internal cache, (5) a second prioritizing module, stored in the memory, that prioritizes objects within the second queue based on respective times the objects spend in the internal cache, (6) a selecting module, stored in the memory, that selects an oldest object having a longest time in any of the first queue and the second queue, and (7) a deleting module, stored in the memory, that deletes the oldest object. The system may also include at least one physical processor that executes the tracking module, the first queuing module, the second queuing module, the first prioritizing module, the second prioritizing module, the selecting module, and the deleting module. In some example systems, more than two queues may be implemented and used for queueing objects.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) track, at the computing device, a respective time an externally-accessed object spends in an external cache, (2) queue, when the externally-accessed object is purged from the external cache, the externally-accessed object in a first queue, (3) queue, when an internally-accessed object is released, the internally-accessed object in a second queue, (4) prioritize objects within the first queue based on a cache-defined internal age factor and on respective times the objects spend in the external cache and respective times the objects spend in an internal cache, (5) prioritize objects within the second queue based on respective times the objects spend in the internal cache, (6) select an oldest object having a longest time in any of the first queue and the second queue; and (7) delete the oldest object.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
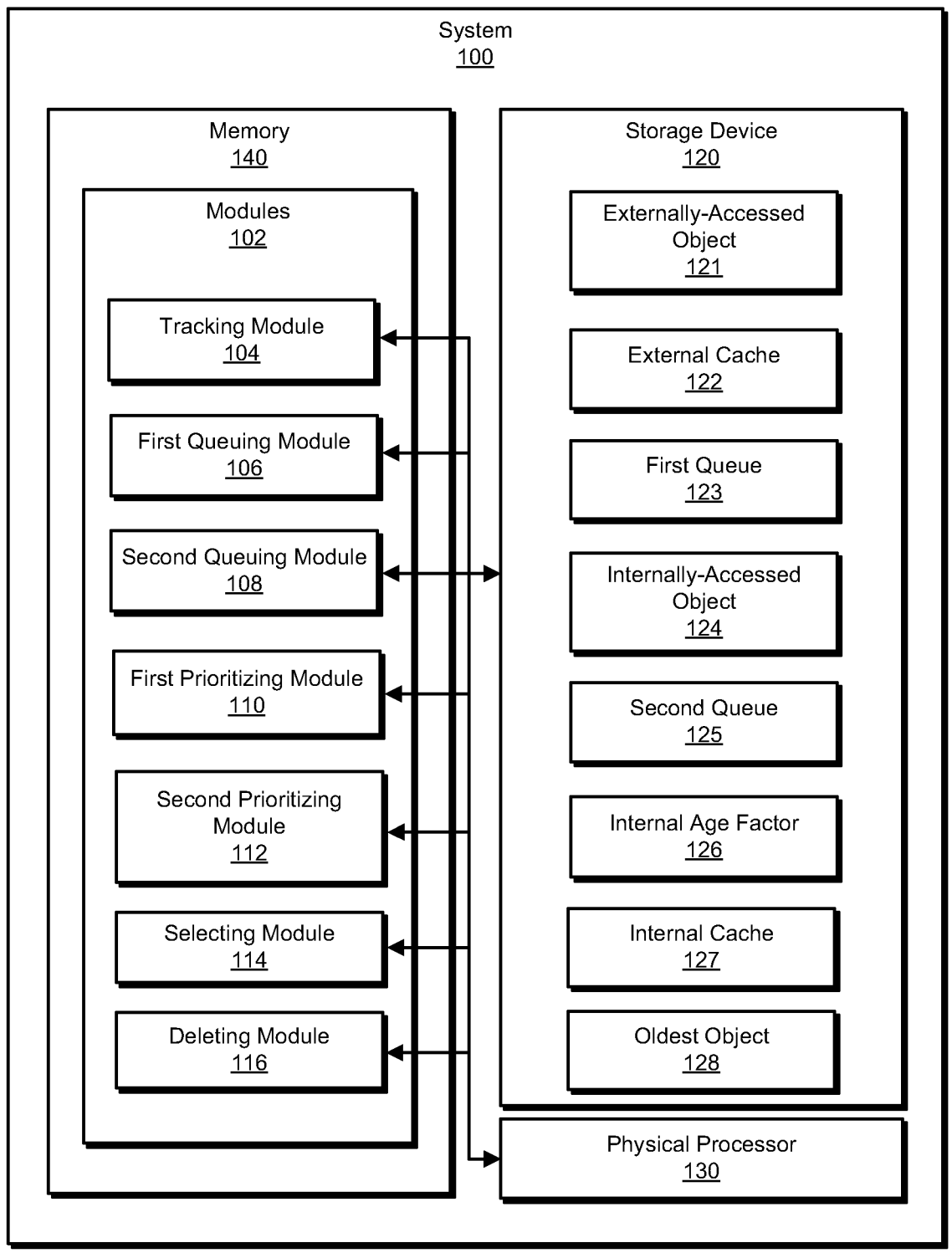
FIG. 1 is a block diagram of an example system for prioritizing cache objects for deletion.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for prioritizing cache objects for deletion. As will be explained in greater detail below, in some examples the systems described herein may enable accounting for objects' respective ages on both internal and external caches when determining which objects to delete. In some embodiments, the provided techniques may take into account times that externally-accessed objects spend on external caches when determining which objects to delete.

By doing so, the systems and methods described herein may improve functioning of computing devices by enabling more accurate and/or efficient determining of which objects to delete and/or overwrite from caches when caches and/or system memory use reaches a maximum amount. Further, the systems and methods described herein may improve the functioning of computing devices by providing more efficient and/or effective memory management. In some embodiments, the systems and methods described herein may improve functioning of computing devices by increasing speed of access to stored objects. In some examples, from a perspective of applications, systems and methods described herein may appear transparent to applications.

Figure 2:
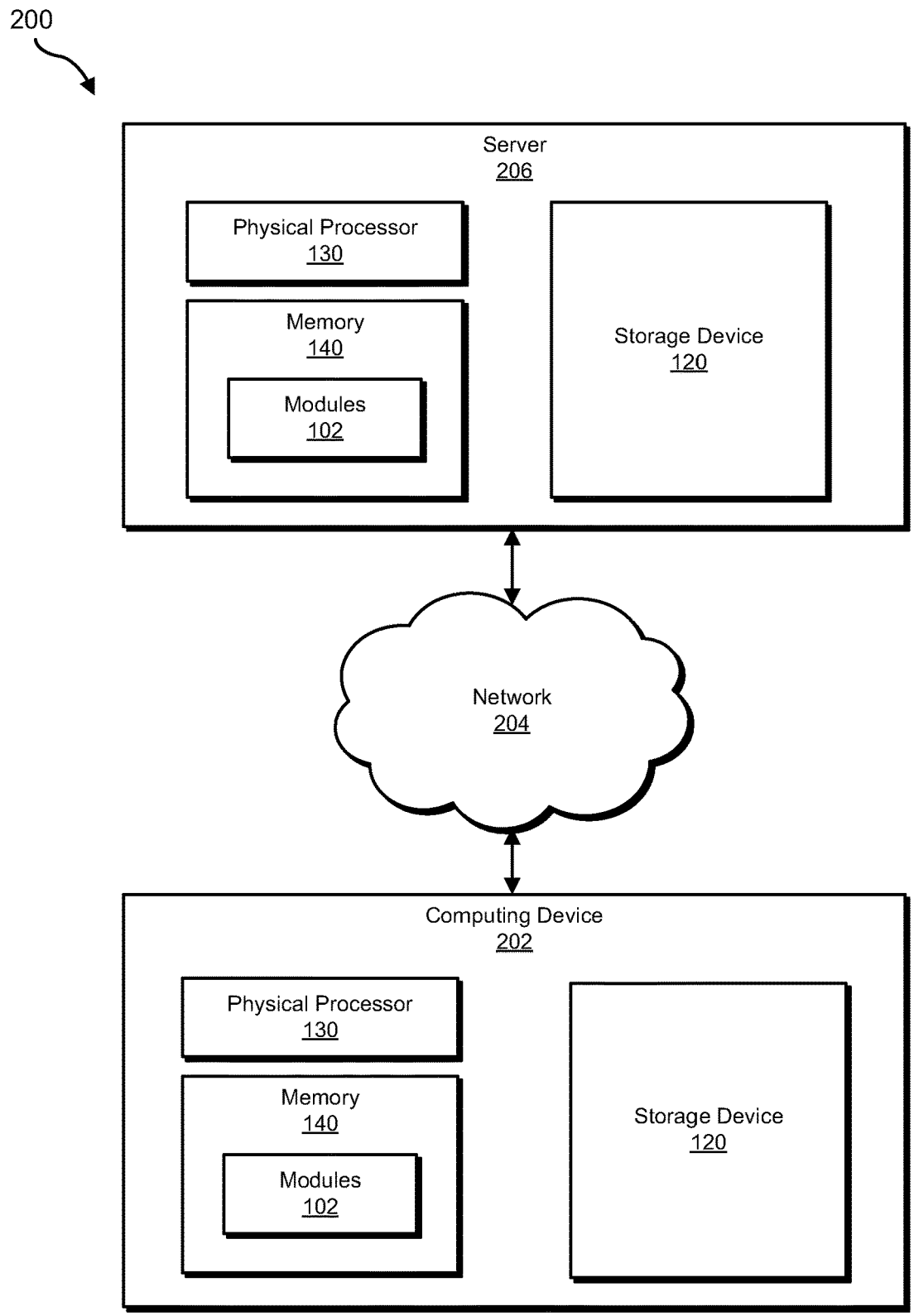
FIG. 2 is a block diagram of an additional example system for prioritizing cache objects for deletion.
Figure 3:
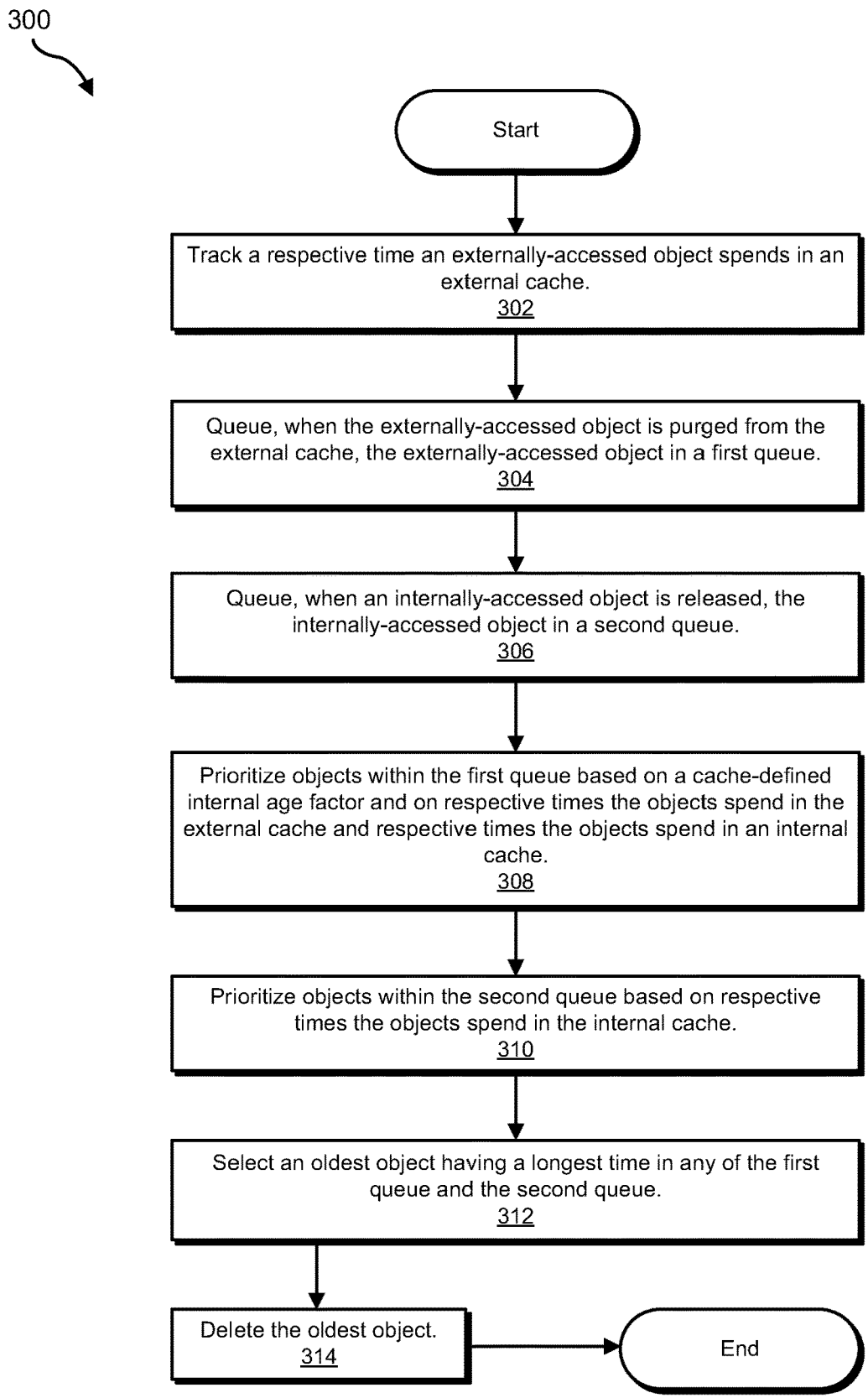
FIG. 3 is a flow diagram of an example method for prioritizing cache objects for deletion.
Figure 4:
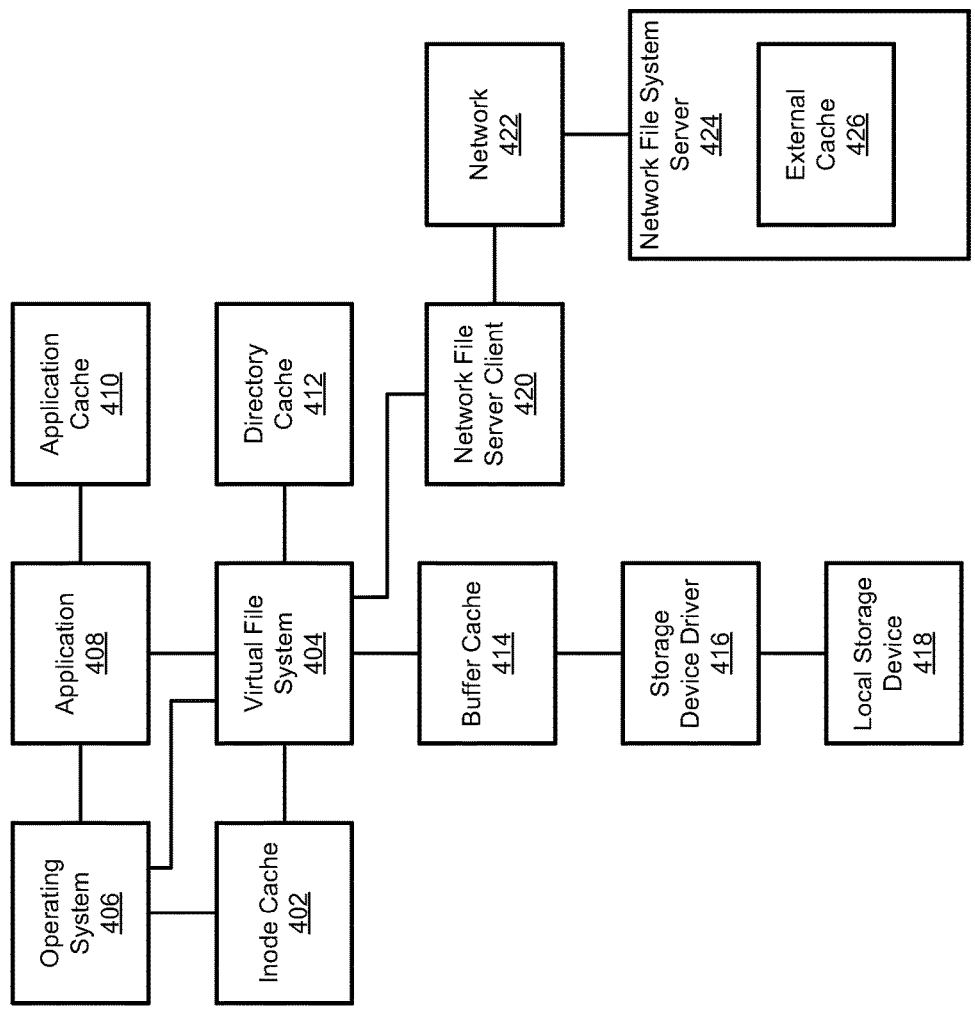
FIG. 4 is a block diagram of an example computer system for prioritizing cache objects for deletion.

The following will provide, with reference to FIGS. 1-2 and 4, detailed descriptions of example systems for prioritizing cache objects for deletion. Detailed descriptions of corresponding computer-implemented methods will also be provided in connection with FIG. 3.

FIG. 1 is a block diagram of an example system 100 for prioritizing cache objects for deletion. As illustrated in this figure, example system 100 may include one or more modules 102 for performing one or more tasks. As will be explained in greater detail below, modules 102 may include a tracking module 104, a first queuing module 106, a second queuing module 108, a first prioritizing module 110, a second prioritizing module 112, a selecting module 114, and a deleting module 116. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of an externally-accessed object 121, an external cache 122, a first queue 123, an internally-accessed object 124, a second queue 125, an internal age factor 126, internal cache 127, and/or an oldest object 128. In some examples, storage device 120 may include more than two queues for queueing objects. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate prioritizing cache objects for deletion. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to prioritize cache objects for deletion.

Computing device 202 generally represents any type or form of computing device capable of reading computer-executable instructions. In some examples, computing device 202 may represent a computer running memory management software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Server 206 generally represents any type or form of computing device that is capable of reading computer-executable instructions. In some examples, computing server 206 may represent a computer running memory management software. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for prioritizing cache objects for deletion. The steps shown in FIG. 3 may be performed by any suitable computer-executable code and/or computing system, including system 100 in FIG. 1, system 200 in FIG. 2, computer system 400 in FIG. 4, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may track respective times externally-accessed objects spend in external caches. The systems described herein may perform step 302 in a variety of ways. For example, tracking module 104 may, as part of computing device 202 and/or server 206 in FIG. 2, track a respective time externally-accessed object 121 spends in external cache 122.

In an example, externally-accessed object 121 may be an inode data structure. In one embodiment, external cache 122 may be an inode cache. In one example, the inode cache may be in a file system layer, an operating system layer, or a network file system layer. In some examples, externally-accessed object 121 may be a vnode data structure. In some embodiments, external cache 122 may be a vnode cache.

The term "inode," as used herein, generally refers to an on-disk data structure in a UNIX-like filesystem such as HEWLETT-PACKARD UNIX (HP-UX), VERITAS File System (VxFS), Linux, etc. that stores information about a file or directory except for the file's data, the directory's data, the file's name, and the directory's name. For example, inodes may include metadata about files such as permissions, files physical locations in storage, modification and creation timestamps, and/or file ownership. Using inodes may enable using multiple filenames for the same file, using hardlinks, and/or moving files between directories in an easy manner.

The term "vnode," as used herein, generally refers to an in-memory data structure that may include data similar to that contained in an inode as well as other data enabling supporting non-inode filesystems. Using vnodes may enable operating systems to use otherwise incompatible filesystems by interfacing with files' vnodes.

The term "object," as used herein, generally refers to files, directories, links, data structures, and/or variables. In some examples, objects may have a value and may be referred to by a pointer.

As illustrated in FIG. 3, at step 304 one or more of the systems described herein may queue, when the externally-accessed objects are purged from the external caches, the externally-accessed objects in first queues. The systems described herein may perform step 304 in a variety of ways. For example, first queuing module 106 may, as part of computing device 202 and/or server 206 in FIG. 2, queue, when externally-accessed object 121 is purged from external cache 122, externally-accessed object 121 in first queue 123.

In some examples, more than two queues may be implemented and used for queueing objects such as externally-accessed object 121.

As illustrated in FIG. 3, at step 306 one or more of the systems described herein may queue, when internally-accessed objects are released, the internally-accessed objects in second queues. The systems described herein may perform step 306 in a variety of ways. For example, second queuing module 108 may, as part of computing device 202 and/or server 206 in FIG. 2, queue, when internally-accessed object 124 is released, internally-accessed object 124 in second queue 125. In some examples, more than two queues may be implemented and used for queueing objects such as internally-accessed object 124.

In an example, internally-accessed object 124 may be an inode data structure. In an example, internally-accessed object 124 may be a vnode data structure.

As illustrated in FIG. 3, at step 308 one or more of the systems described herein may prioritize objects within the first queues based on cache-defined internal age factors and on respective times the objects spend in the external caches and respective times the objects spend in internal caches. The systems described herein may perform step 308 in a variety of ways. For example, first prioritizing module 110 may, as part of computing device 202 and/or server 206 in FIG. 2, prioritize objects within first queue 123 based on cache-defined internal age factor 126 and on respective times objects (e.g., externally-accessed object 121) spend in external cache 122 and respective times the objects spend in internal cache 127.

In one embodiment, external cache 122 may be an inode cache. In one example, the inode cache may be in a file system layer, an operating system layer, or a network file system layer. In one embodiment, external cache 122 may be a vnode cache.

As illustrated in FIG. 3, at step 310 one or more of the systems described herein may prioritize objects within the second queues based on respective times the objects spend in the internal caches. The systems described herein may perform step 310 in a variety of ways. For example, second prioritizing module 112 may, as part of computing device 202 and/or server 206 in FIG. 2, prioritize objects (e.g., internally-accessed object 124) within second queue 125 based on respective times the objects spend in internal cache 127.

As illustrated in FIG. 3, at step 312 one or more of the systems described herein may select oldest objects having longest times in any of the first queues and the second queues. The systems described herein may perform step 312 in a variety of ways. For example, selecting module 114 may, as part of computing device 202 and/or server 206 in FIG. 2, select an oldest object (e.g., externally-accessed object 121 and/or internally-accessed object 124) having a longest time in any of first queue 123 and second queue 125.

As illustrated in FIG. 3, at step 314 one or more of the systems described herein may delete the oldest objects. The systems described herein may perform step 314 in a variety of ways. For example, deleting module 116 may, as part of computing device 202 and/or server 206 in FIG. 2, delete oldest object 128. In an example, oldest object 128 may be externally-accessed object 121 or internally-accessed object 124.

In an example, the deleting may be initiated by at least one of a system memory reaching maximum capacity and an in-core cache reaching maximum capacity.

In an embodiment, the method 300 may further include using third queues to further account for times that externally-scoped and internally re-accessed objects spend in internal caches. In step 306 or following step 306, when objects in the first queues are released after having been re-accessed internally, queue the internally re-accessed objects in third queues. In an example, these objects may be externally-scoped. After step 306, prioritize objects in the third queues based on respective times the objects in the third queues spend in the internal cache. During the selecting in step 312, select an oldest object having a longest time in any of the first queue, the second queue, and the third queue.

In one embodiment, method 300 may include at least one of (1) setting, when the externally-accessed object is purged, a respective unhold flag, (2) setting, when the externally-accessed object in the first queue re-accessed internally, a hold flag, (3) transferring, when the externally-accessed object in the first queue having both a respective hold flag and a respective unhold flags set is released, the externally-accessed object to a third queue, and (4) prioritizing objects within the third queue based on time spent in the internal cache. The selecting may further include selecting the oldest object having a longest time in any of the first queue, the second queue, and the third queue. In an example, method 300 may also include (5) setting the respective hold flag when the externally-accessed object is initially accessed externally, and (6) clearing, when the externally-accessed object is purged, the hold flag.

In further examples, method 300 may include at least one of (1) tracking time spent in an external cache by an externally-accessed object, (2) queueing, when the externally-accessed object is purged, the externally-accessed object in Queue-1, (3) queueing, when an internally-accessed object is released, queueing the internally-accessed object in Queue-2, (4) prioritizing objects within Queue-1, based on a cache-defined internal age factor and based on time spent in an external cache plus time spent in an internal cache, (5) prioritizing objects within Queue-2 based on time spent in the internal cache, (6) selecting an oldest object having a longest time in any of Queue-1 and Queue-2, and (7) deleting the oldest object. In some examples, method 300 may also include (1) setting, when the externally-accessed object is purged, a respective unhold flag, (2) setting, when the externally-accessed object in Queue-1 re-accessed internally, a hold flag, (3) transferring, when the externally-accessed object in Queue-1 having both a respective hold flag and a respective unhold flags set is released, the externally-accessed object to Queue-3, and (4) prioritizing objects within Queue-3 based on time spent in an internal cache. In some examples, selecting may further include selecting the oldest object having a longest time in any of Queue-1 and Queue-2, and Queue-3. Moreover, method 300 may include setting the respective hold flag when the externally-accessed object is initially accessed externally and resetting, when the externally-accessed object is purged, the hold flag. In an example, Queue-1, Queue-2, and/or Queue-3 may be stored in a storage device (e.g., storage device 120) and/or a memory device (e.g., memory 140).

In an example, method 300 may include at least one of: (1) on allocation of an object, setting a nohold flag to indicate the object is not accessed externally, (2) changing the nohold flag to a hold flag when object is accessed externally, (3) tracking an age of an object having the hold flag set, (4) starting queuing, (5) when the externally-accessed object is purged, queueing the externally-accessed object in Queue-1 and changing the hold flag for the externally-accessed object to unhold, (6) when an internally-accessed object is released, queueing the internally-accessed object in Queue-2, (7) when the externally-accessed object in Queue-1 re-accessed internally, adding a hold flag, (8) when externally-accessed object in Queue-1 re-accessed externally, adding a hold flag and deleting the unhold flag, (9) when the externally-accessed object in Queue-1 having both hold flag and unhold flags is released, transferring the externally-accessed object to Queue-3 (where external age factor not considered), (10) adding objects from Queue-1, then Queue-2, then Queue-3 to a prioritized list of objects, (11) prioritizing objects within Queue-1 based on time spent in an external cache plus time spent in an internal cache, (12) prioritizing objects within Queue-2 based on time spent in an internal cache, (13) prioritizing objects within Queue-3 based on time spent in an internal cache, (14) selecting, for deletion, an object having a longest time in any of Queue-1, Queue-2, and Queue-3, and (15) deleting the selected object. In some examples, Queue-1, Queue-2, and/or Queue-3 may be stored in a storage device (e.g., storage device 120) and/or a memory device (e.g., memory 140).

As detailed above, the steps outlined in method 300 in FIG. 3 may provide systems and methods for prioritizing cache objects for deletion. By doing so, the systems and methods described herein may enable more accurate and/or efficient determining of which objects to delete and/or overwrite from a cache when cache and/or system memory use reaches a maximum amount. Further, the systems and methods described herein may improve functioning of computing devices by providing more efficient and/or effective memory management. In some examples, from a perspective of applications, systems and methods described herein may appear transparent to applications.

FIG. 4 is a block diagram of a computer system 400 for prioritizing cache objects for deletion. In some examples, computer system 400 may include an inode cache 402, a virtual file system 404, an operating system 406, an application 408, an application cache 410, a directory cache 412, a buffer cache 414, a storage device driver 416, local storage device 418, network file server client 420, network 422, and/or network file system server 424. Network file system server 424 may include external cache 426. In one example, all or a portion of the functionality of modules 102 may be performed by computer system 400. As will be described in greater detail below, one or more of modules 102 from FIG. 1 may, when executed by at least one processor of computer system 400 (e.g., physical processor 130), enable computer system 400 to prioritize cache objects for deletion.

Computer system 400 generally represents any type or form of computing device capable of reading computer-executable instructions. In some examples, computer system 400 may represent computer running memory management software. Additional examples of computer system 400 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

In some embodiments, inode cache 402, application cache 410, directory cache 412, and/or buffer cache 414 are examples of internal caches that are internally-accessible. In an example, inode cache 402, virtual file system 404, operating system 406, application 408, application cache 410, directory cache 412, buffer cache 414, storage device driver 416, and/or network file server client 420 may be stored at least in part in local storage device 418 and/or a memory device (e.g., memory 140).

Virtual file system 404 generally represents any set of computer-executable instructions that provides uniform interfaces between operating systems and physical storage device drivers. Virtual file system 404 may provide a logical file system and may provide an interface between logical and physical file systems. Virtual file system 404 may enable and/or control caching of information communicated with operating system 406, application 408, local storage device 418, and/or external cache 426.

Network file server client 420 generally represents any set of computer-executable instructions that provides uniform interfaces between virtual file systems and network-connected file servers.

Network 422 generally represents any medium or architecture capable of facilitating communication or data transfer. In one example, network 422 may facilitate communication between network file server client 420 and network file system server 424. In this example, network 422 may facilitate communication or data transfer using wireless and/or wired connections. Examples of network 422 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Network file server client 420 generally represents any type or form of computing device that is capable of reading computer-executable instructions. In some examples, network file server client 420 may represent a computer running memory management software that accesses external cache 426. External cache 426 may be externally-accessible. Additional examples of network file server client 420 include, without limitation, storage servers, database servers, application servers, and/or web servers configured to run certain software applications and/or provide various storage, database, and/or web services. Although illustrated as a single entity in FIG. 4, network file server client 420 may include and/or represent a plurality of servers that work and/or operate in conjunction with one another.

Many other devices or subsystems may be connected to computer system 400. Conversely, all of the components and devices illustrated in FIG. 4 need not be present to practice the embodiments described and/or illustrated herein. The devices and subsystems referenced above may also be interconnected in different ways from that shown in FIG. 4. Computer system 400 may also employ any number of software, firmware, and/or hardware configurations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for prioritizing cache objects for deletion, at least a portion of the method being performed by a computing device comprising at least one processor, the method comprising:
    tracking, at the computing device, a respective time an externally-accessed object spends in an external cache;
    queuing, when the externally-accessed object is purged from the external cache, the externally-accessed object in a first queue;
    queuing, when an internally-accessed object is released, the internally-accessed object in a second queue;
    prioritizing objects within the first queue, based on a cache-defined internal age factor and on respective times the objects spend in the external cache and respective times the objects spend in an internal cache;
    prioritizing objects within the second queue based on respective times the objects spend in the internal cache;
    using a third queue to account for delay times in at least one internal cache
    prioritizing objects within the third queue based on time spent in the at least one internal cache,
    selecting the oldest object having a longest time in any of the first queue, the second queue, and the third queue; and
    deleting the oldest object.

2. The computer-implemented method of claim 1, wherein at least one of the externally-accessed object and the internally-accessed object is an inode data structure.

3. The computer-implemented method of claim 1, wherein at least one of the internal cache and the external cache is an inode cache.

4. A computer-implemented method for prioritizing cache objects for deletion, at least a portion of the method being performed by a computing device comprising at least one processor, the method comprising:
    tracking, at the computing device, a respective time an externally-accessed object spends in an external cache;

queuing, when the externally-accessed object is purged from the external cache, the externally-accessed object in a first queue;

queuing, when an internally-accessed object is released, the internally-accessed object in a second queue;

prioritizing objects within the first queue, based on a cache-defined internal age factor and on respective times the objects spend in the external cache and respective times the objects spend in an internal cache;

prioritizing objects within the second queue based on respective times the objects spend in the internal cache;

using a third queue to account for delay times in at least one internal cache;

in response to objects in the first queue being released after having been accessed internally, queuing the internally-accessed objects in a third queue;

prioritizing objects within the third queue based on time spent in the at least one internal cache;

selecting the oldest object having a longest time in any of the first queue, the second queue, and the third queue; and deleting the oldest object.

5. The computer-implemented method of claim 4, wherein at least one of the externally-accessed object and the internally-accessed object is an inode data structure.

6. The computer-implemented method of claim 4, wherein at least one of the internal cache and the external cache is an inode cache.

7. A system for prioritizing cache objects for deletion, the system comprising:

a tracking module, stored in memory, that tracks a respective time an externally-accessed object spends in an external cache;

a first queuing module, stored in the memory, that queues, when the externally-accessed object is purged from the external cache, the externally-accessed object in a first queue;

a second queuing module, stored in the memory, that queues, when an internally-accessed object is released, the internally-accessed object in a second queue;

a third queuing module to account for times in at least one internal cache;

a first prioritizing module, stored in the memory, that prioritizes objects within the first queue, based on a cache-defined internal age factor and on respective times the objects spend in the external cache and respective times the objects spend in an internal cache;

a second prioritizing module, stored in the memory, that prioritizes objects within the second queue based on respective times the objects spend in the internal cache;

a third prioritization module to prioritize objects within the third queuing module based on time spent in the at least one internal cache;

a selecting module, stored in the memory, that selects an oldest object having a longest time in any of the first queuing module, the second queuing module, and the third queuing module;

a deleting module, stored in the memory, that deletes the oldest object; and at least one physical processor that executes the tracking module, the first queuing module, the second queuing module, the first prioritizing module, the second prioritizing module, the selecting module, and the deleting module.

8. The system of claim 7, wherein at least one of the externally-accessed object and the internally-accessed object is an inode data structure.

9. The system of claim 7, wherein at least one of the internal cache and the external cache is an inode cache.

10. The system of claim 9, wherein the inode cache is in a file system layer, an operating system layer, or a network file system layer.

11. A non-transitory computer-readable medium comprising one or more computer-executable instructions that, when executed by at least one processor of a computing device, cause the computing device to:

track, at the computing device, a respective time an externally-accessed object spends in an external cache;

queue, when the externally-accessed object is purged from the external cache, the externally-accessed object in a first queue;

queue, when an internally-accessed object is released, the internally-accessed object in a second queue;

use a third queue to account for times in at least one internal cache;

prioritize objects within the first queue based on a cache-defined internal age factor and on respective times the objects spend in the external cache and respective times the objects spend in an internal cache;

prioritize objects within the third queue based on time spent in the at least one internal cache;

select an oldest object having a longest time in any of the first queue, the second queue, and the third queue; and delete the oldest object.

12. The non-transitory computer-readable medium of claim 11, wherein the computer-executable instructions further comprise computer-executable instructions that cause the computing device to:

in response to objects in the first queue being released after having been accessed internally, queuing the internally-accessed objects in a third queue.

13. The non-transitory computer-readable medium of claim 11, wherein at least one of the externally-accessed object and the internally-accessed object is an inode data structure.

14. The non-transitory computer-readable medium of claim 11, wherein at least one of the internal cache and the external cache is an inode cache.

15. The non-transitory computer-readable medium of claim 14, wherein the inode cache is in a file system layer, an operating system layer, or a network file system layer.

\* \* \* \* \*